US012679651B2

(12) United States Patent
Peng et al.

(10) Patent No.: US 12,679,651 B2
(45) Date of Patent: Jul. 14, 2026

(54) WAREHOUSING MANAGEMENT METHOD AND APPARATUS, DEVICE, MEDIUM, PROGRAM PRODUCT, AND SYSTEM

(71) Applicant: HAI ROBOTICS CO., LTD., Shenzhen (CN)

(72) Inventors: Yifan Peng, Shenzhen (CN); Hongxia Zhou, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 478 days.

(21) Appl. No.: 18/342,862

(22) Filed: Jun. 28, 2023

(65) Prior Publication Data

US 2023/0339684 A1 Oct. 26, 2023

Related U.S. Application Data

(63) Continuation of application No. PCT/CN2021/138660, filed on Dec. 16, 2021.

(30) Foreign Application Priority Data

Dec. 29, 2020 (CN) .......................... 202011599986.0

(51) Int. Cl.
*B65G 1/137* (2006.01)
*G06Q 10/0631* (2023.01)
(Continued)

(52) U.S. Cl.
CPC ......... *B65G 1/1371* (2013.01); *B65G 1/1373* (2013.01); *G06Q 10/06311* (2013.01); *G06Q 10/08* (2013.01); *G06Q 10/087* (2013.01)

(58) Field of Classification Search
CPC ................ B65G 1/1371; B65G 1/1373; G06Q 10/06311; G06Q 10/08; G06Q 10/087
See application file for complete search history.

(56) References Cited

U.S. PATENT DOCUMENTS

2004/0044431 A1* 3/2004 Pellegrini ............ G05B 19/418
                                                                    700/121
2008/0004939 A1* 1/2008 Li .......................... G06Q 30/02
                                                                    700/97
(Continued)

FOREIGN PATENT DOCUMENTS

CN        103818672 A    5/2014
CN        105389639 A    3/2016
(Continued)

OTHER PUBLICATIONS

International Search Report for PCT/CN2021/138660.

*Primary Examiner* — Ernesto A Suarez
*Assistant Examiner* — Laurence R Brothers
(74) *Attorney, Agent, or Firm* — Ladas & Parry, LLP

(57) ABSTRACT

The present disclosure provides a warehousing management method and apparatus, a device, a medium, a program product, and a system. In the method provided in the present disclosure, before a warehousing management system delivers task information each time, a first operation parameter used for completing a current task can be accurately calculated by learning a historical data record in a historical task, and a target robot configured to perform the current task operates according to the first operation parameter. In this way, the current task may be smoothly completed without error calibration or only through simple calibration, so that efficiency of performing a task is improved, thereby greatly improving goods taking/placing efficiency of an intelligent warehousing system.

19 Claims, 5 Drawing Sheets

(51) Int. Cl.
   G06Q 10/08      (2024.01)
   G06Q 10/087      (2023.01)

(56)           References Cited

U.S. PATENT DOCUMENTS

| | | | |
|---|---|---|---|
| 2018/0117769 A1* | 5/2018 | Delazari Binotto | . G05D 1/0246 |
| 2019/0012721 A1* | 1/2019 | Fujita ................. | G06Q 30/0635 |
| 2019/0062055 A1 | 2/2019 | Hance | |

FOREIGN PATENT DOCUMENTS

| | | | | | |
|---|---|---|---|---|---|
| CN | 105773615 A | 7/2016 | | | |
| CN | 106005866 A | 10/2016 | | | |
| CN | 106877746 A | 6/2017 | | | |
| CN | 107272696 A | 10/2017 | | | |
| CN | 109264275 A | 1/2019 | | | |
| CN | 107000208 B | 5/2019 | | | |
| CN | 109858859 A | 6/2019 | | | |
| CN | 111232590 A | 6/2020 | | | |
| CN | 111539780 A | 8/2020 | | | |
| CN | 111768155 A | 10/2020 | | | |
| CN | 112036773 A | 12/2020 | | | |
| CN | 112044784 A | * | 12/2020 | ............... | B07C 3/12 |
| CN | 112849899 A | * | 5/2021 | ........... | G06Q 10/087 |
| WO | WO2020034044 A1 | 2/2020 | | | |

* cited by examiner

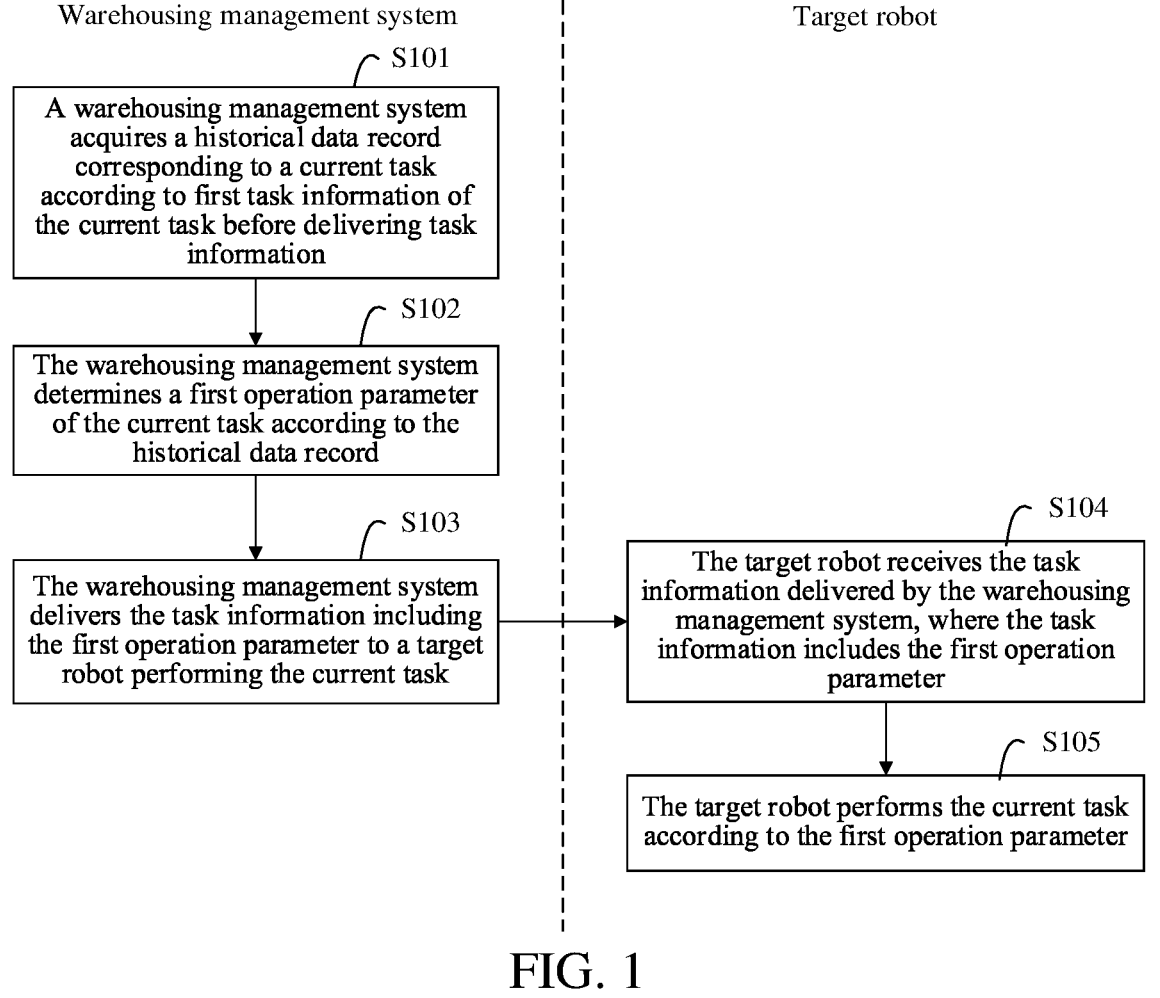

Warehousing management system

Target robot

S101

A warehousing management system acquires a historical data record corresponding to a current task according to first task information of the current task before delivering task information

S102

The warehousing management system determines a first operation parameter of the current task according to the historical data record

S103

The warehousing management system delivers the task information including the first operation parameter to a target robot performing the current task

S104

The target robot receives the task information delivered by the warehousing management system, where the task information includes the first operation parameter

S105

The target robot performs the current task according to the first operation parameter

FIG. 1

WAREHOUSING MANAGEMENT METHOD AND APPARATUS, DEVICE, MEDIUM, PROGRAM PRODUCT, AND SYSTEM

CROSS-REFERENCE TO RELATED APPLICATIONS

The present disclosure is a continuation of International Patent Application No. PCT/CN2021/138660, filed on Dec. 16, 2021, which claims priority to Chinese Patent Application No. 202011599986.0, filed with the China National Intellectual Property Administration on Dec. 29, 2020 and entitled "WAREHOUSING MANAGEMENT METHOD AND APPARATUS, DEVICE, MEDIUM, PROGRAM PRODUCT, AND SYSTEM", which are incorporated herein by references in their entireties.

TECHNICAL FIELD

The present disclosure relates to the field of intelligent warehousing technologies, and in particular, to a warehousing management method and apparatus, a device, a medium, a program product, and a system.

BACKGROUND

In an intelligent warehousing system, during a conventional operation performed by a robot, location information of an storage location is usually sent to the robot, and the robot moves to a corresponding location to take out/place a goods box. There is an error between a location of a fork of the robot for taking out/placing goods and an actual location of an storage location or a target box in the storage location due to differences between different racks, placement angles of boxes on the rack, and heights of the boxes etc. The robot can take out/place the goods after calibrating the error. A period of time is required for calibrating the error by the robot, resulting in low efficiency of taking out/placing goods by the robot.

SUMMARY

The present disclosure provides a warehousing management method and apparatus, a device, a medium, a program product, and a system, to resolve a problem of low goods taking/placing efficiency of a robot.

A first aspect of the present disclosure provides a warehousing management method, applied to a warehousing management system, the method including:

acquiring, before delivering task information, a historical data record corresponding to a current task according to first task information of the current task; determining a first operation parameter of the current task according to the historical data record; and delivering the task information including the first operation parameter to a target robot performing the current task.

In an optional implementation, the first task information of the current task includes information on one or more of the following dimensions: target robot's first information, target box's first information, or target storage location's first information.

In an optional implementation, after the delivering the task information including the first operation parameter to a target robot performing the current task, the method further includes:

keeping a data record of the current task, where the data record includes: a second operation parameter, the first operation parameter, and information on one or more of the following dimensions of the current task: target robot's second information, target box's second information, or target storage location's second information.

In an optional implementation, before the keeping a data record of the current task, the method further includes:

receiving the second operation parameter of the current task sent by the target robot.

In an optional implementation, the keeping a data record of the current task includes:

the keeping a data record of the current task including recording the target robot's second information if second operation parameters of different robots for a same box in a same storage location do not converge according to historical task data in a period of time.

In an optional implementation, the keeping a data record of the current task including recording the target robot's second information if second operation parameters of different robots for a same box in a same storage location do not converge according to historical task data in a period of time includes:

the keeping a data record of the current task including recording a type of the target robot if second operation parameters of robots of different types for the same box in the same storage location do not converge according to the historical task data in the period of time.

In an optional implementation, the keeping a data record of the current task including recording the target robot's second information if second operation parameters of different robots for a same box in a same storage location do not converge according to historical task data in a period of time includes:

the keeping a data record of the current task including recording a type and identification information of the target robot if second operation parameters of different robots of a same type for the same box in the same storage location do not converge according to the historical task data in the period of time.

In an optional implementation, the keeping a data record of the current task includes:

the keeping a data record of the current task including recording the target box's second information if second operation parameters of a same robot for operating different boxes do not converge to a first expected operation parameter according to historical task data in a period of time, where the target box's second information includes at least one of the following: a type, a size, a volume, and a weight of a box.

In an optional implementation, the keeping a data record of the current task includes:

the keeping a data record of the current task including recording the target storage location's second information if second operation parameters of a same robot for operating a same box in different storage locations do not converge to a second expected operation parameter according to historical task data in a period of time.

In an optional implementation, the determining a first operation parameter of the current task according to the historical data record includes:

if the current task is box taking, determining, according to a second operation parameter of a first task of placing a target box of the current task into a target storage location and the historical data record, a first operation parameter for taking out the target box from the target storage location.

In an optional implementation, the determining a first operation parameter of the current task according to the historical data record includes:

if the current task is box placing, determining, according to the historical data record, a first operation parameter for placing a target box of the current task into a target storage location.

In an optional implementation, the acquiring a historical data record corresponding to a current task according to first task information of the current task includes:

acquiring historical data records of all historical tasks; selecting, according to information on at least one dimension, a historical data record consistent with the information on at least one dimension of information on a target storage location and a target box of the current task, and the target robot performing the current task from the historical data records of all the historical tasks, where operation parameter information in the selected historical data record conforms to a mathematical distribution law, and the operation parameter information includes a second operation parameter and/or a first operation parameter; and using the selected historical data record as the historical data record corresponding to the current task.

In an optional implementation, the information on the target storage location and the target box of the current task, and the target robot performing the current task includes at least one of the following:

location information of the target storage location, a type, a size, a volume, and a weight of the target box, and a type and identification information of the target robot.

In an optional implementation, the determining a first operation parameter of the current task according to the historical data record includes:

acquiring operation parameter information in the historical data record, where the operation parameter information includes a second operation parameter and/or a first operation parameter; and calculating the first operation parameter of the current task according to the operation parameter information.

In an optional implementation, the calculating the first operation parameter of the current task according to the operation parameter information includes:

determining weight information corresponding to the operation parameter information; calculating a weighted mean of the operation parameter information according to the weight information; and using the weighted mean as the first operation parameter of the current task.

In an optional implementation, the determining weight information corresponding to the operation parameter information includes:

determining the weight information corresponding to the operation parameter information according to execution time points of the operation parameter information, where the weight information corresponding to the operation parameter information monotonically increases in chronological order of the execution time points.

In an optional implementation, the calculating the first operation parameter of the current task according to the operation parameter information includes:

determining operation parameter information with a highest frequency of occurrence in the operation parameter information; and using the operation parameter information with the highest frequency of occurrence as the first operation parameter of the current task.

In an optional implementation, the calculating the first operation parameter of the current task according to the operation parameter information includes:

determining a mean and a standard deviation of the operation parameter information through a maximum likelihood estimation method if it is determined that the operation parameter information obeys normal distribution; and using the mean as the first operation parameter of the current task if the standard deviation is less than a standard deviation threshold.

In an optional implementation, the method further includes:

determining the first operation parameter of the current task as a preset parameter value if the historical data record consistent with the information on at least one dimension of the information on the target storage location and the target box of the current task, and the target robot performing the current task fails to be selected, where the operation parameter information in the selected historical data record conforms to the mathematical distribution law.

In an optional implementation, the preset parameter value is null; or the preset parameter value is a set parameter corresponding to the first task information of the current task.

A second aspect of the present disclosure provides a warehousing management method, applied to a robot, the method including:

receiving task information delivered by a warehousing management system, where the task information includes a first operation parameter; and performing a current task according to the first operation parameter.

In an optional implementation, the performing a current task according to the first operation parameter includes:

performing the current task according to a set parameter if the first operation parameter is null.

In an optional implementation, after the performing a current task according to the first operation parameter, the method further includes:

sending a second operation parameter for performing the current task to the warehousing management system.

A third aspect of the present disclosure provides a warehousing management apparatus, applied to a warehousing management system, the apparatus including:

a data acquisition module, configured to acquire, before task information is delivered, a historical data record corresponding to a current task according to first task information of the current task;

an operation parameter determining module, configured to determine a first operation parameter of the current task according to the historical data record; and a task delivery module, configured to deliver the task information including the first operation parameter to a target robot performing the current task.

A fourth aspect of the present disclosure provides a warehousing management apparatus, applied to a robot, the apparatus including:

a task receiving module, configured to receive task information delivered by a warehousing management system, where the task information includes a first operation parameter; and a task execution module, configured to perform a current task according to the first operation parameter.

A fifth aspect of the present disclosure provides a warehousing management system, including:

a processor, a memory, and a computer program stored on the memory and running on the processor, where the processor, when running the computer program, implements the method according to any one of the first aspect.

A sixth aspect of the present disclosure provides a robot, including:

a processor, a memory, and a computer program stored on the memory and running on the processor, where the processor, when running the computer program, implements the method according to any one of the second aspect.

A seventh aspect of the present disclosure provides an intelligent warehousing system, including the warehousing management system according to the fifth aspect and the robot according to the sixth aspect.

An eighth aspect of the present disclosure provides a computer-readable storage medium, storing a computer program, the computer program, when executed by a processor, implementing the method according to any one of the first aspect or the second aspect.

A ninth aspect of the present disclosure provides a computer program product, including a computer program, the computer program, when executed by a processor, implementing the method according to any one of the first aspect or the second aspect.

According to the warehousing management method and apparatus, the device, the medium, the program product, and the system provided in the present disclosure, before the warehousing management system delivers the task information each time, the first operation parameter used for completing the current task can be accurately calculated by learning the historical data record of the historical task; and the target robot to perform the current task operates according to the first operation parameter, and the current task may be smoothly completed without error calibration or only through simple calibration, so that efficiency of performing a task is improved, thereby greatly improving goods taking/placing efficiency of the intelligent warehousing system.

BRIEF DESCRIPTION OF THE DRAWINGS

FIG. 1 is a flowchart of a warehousing management method according to Embodiment 1 of the present disclosure.

Figure 2:
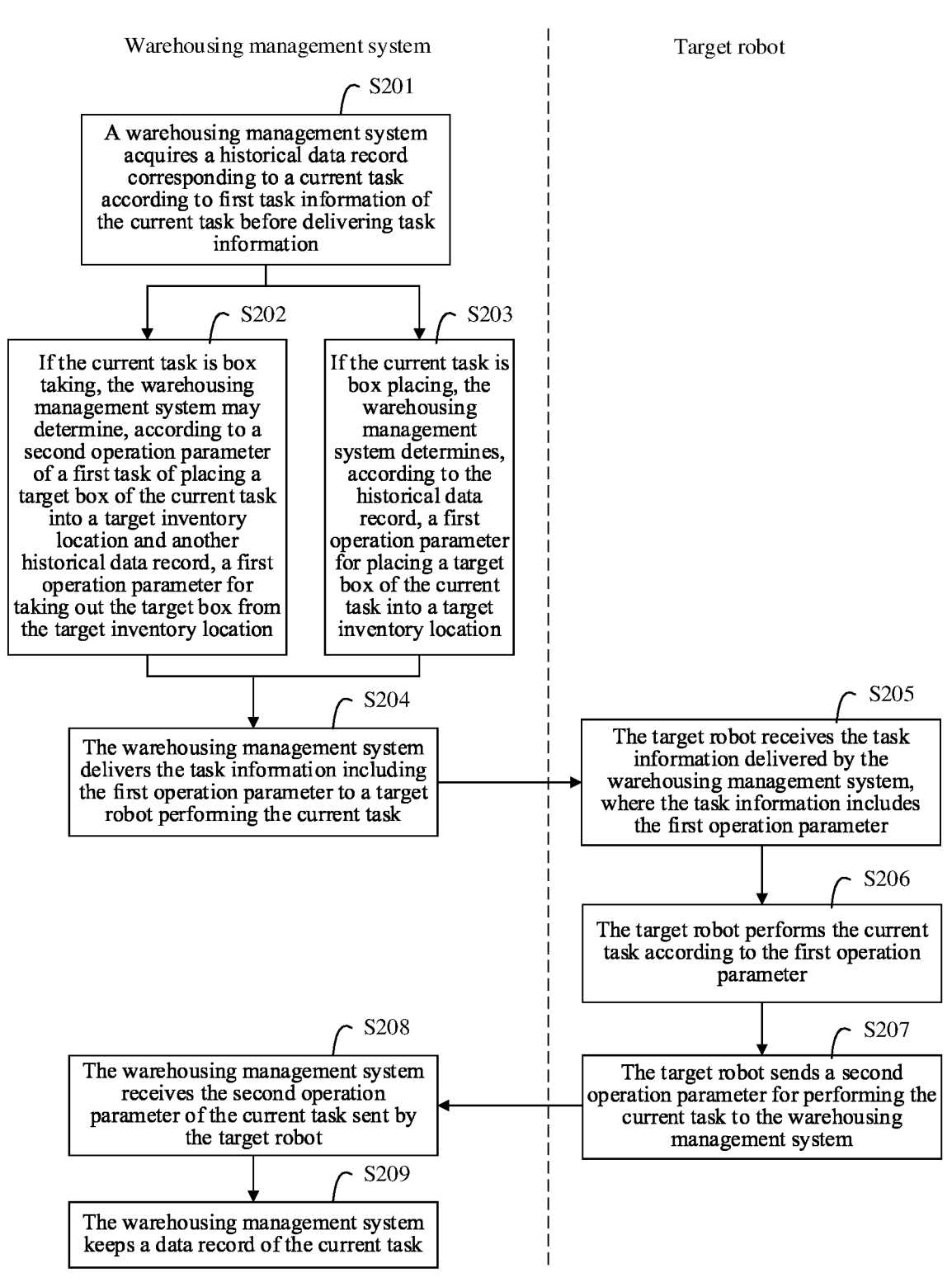
FIG. 2 is a flowchart of a warehousing management method according to Embodiment 2 of the present disclosure.

Explicit embodiments of the present disclosure are shown by the above drawings, and more detailed description will be given below. These drawings and text description are not for limiting the scope of the concept of the present disclosure in any way, but for illustrating the concept of the present disclosure for those skilled in the art by referring to specific embodiments.

DETAILED DESCRIPTION

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

In addition, the terms such as "first", "second", and "third" involved in the present disclosure are used merely for the purpose of description, and shall not be construed as indicating or implying relative importance or implying a quantity of indicated technical features. In the descriptions of the following embodiments, unless explicitly specified, "a plurality of" means two or more.

The technical solutions of the present disclosure and how the technical solutions resolve the above technical problems are described in detail in the specific embodiments hereinafter. The following specific embodiments may be combined with each other, and the same or similar concepts or processes may not be described repeatedly in some embodiments. The embodiments of the present disclosure are described below with reference to the accompanying drawings.

Embodiment 1

FIG. 1 is a flowchart of a warehousing management method according to Embodiment 1 of the present disclosure. As shown in FIG. 1, the method includes the following steps:

Step S101: A warehousing management system acquires a historical data record corresponding to a current task according to first task information of the current task before delivering task information.

The first task information may include information that is related to the current task and may affect an operation parameter of the task, and may include related information on one or more dimensions of a target box on which an operation needs to be performed in the current task, a target storage location where the target box is to be placed into or taken out, or a target robot that performs the current task.

For example, information of the box may include information such as a type, a size, a volume, and a weight of the box, and whether the box is deformed, information of the storage location may include a location of the storage location, and information of the robot may include a type, an identifier, and the like of the robot.

In this embodiment, before delivering task information to the robot, the warehousing management system may acquire a historical data record related to the current task according to the first task information of the current task as the historical data record corresponding to the current task. The current task may be a box taking task or a box placing task.

The historical data record is a data record related to a historical task and may include related information of a box, a robot, an storage location, and the like in the historical task, an operation parameter delivered by the warehousing management system for reference, an actual operation parameter for performing the historical task, and the like.

Step S102: The warehousing management system determines a first operation parameter of the current task according to the historical data record.

The first operation parameter is an operation parameter calculated based on the historical data record in the current task. The first operation parameter may be carried in the task information and may be sent to the robot that performs the current task, and the robot performs the current task according to the first operation parameter.

In this embodiment, a first operation parameter for performing the current task may be calculated according to a related operation record in the historical task, where the first operation parameter is an actual operation parameter or is very close to the actual operation parameter.

Step S103: The warehousing management system delivers the task information including the first operation parameter to a target robot performing the current task.

After the first operation parameter of the current task is determined, task information is delivered to a target robot performing the current task, where the task information includes the calculated first operation parameter of the current task, so that the target robot performs the current task according to the first operation parameter.

Step S104: The target robot receives the task information delivered by the warehousing management system, where the task information includes the first operation parameter.

After receiving the task information delivered by the warehousing management system, the target robot may extract the first operation parameter from the task information.

Step S105: The target robot performs the current task according to the first operation parameter.

The target robot correspondingly operates and performs the current task according to the first operation parameter.

In this embodiment, the target robot performs a corresponding operation according to the first operation parameter, and the current task may be smoothly completed without error calibration or only through simple calibration.

In the embodiments in the present disclosure, before a warehousing management system delivers task information each time, a first operation parameter used for completing a current task can be accurately calculated by learning a historical data record in a historical task, and a target robot configured to perform the current task operates according to the first operation parameter. In this way, the current task may be smoothly completed without error calibration or only through simple calibration, so that efficiency of performing a task is improved, thereby greatly improving goods taking/placing efficiency of an intelligent warehousing system.

Embodiment 2

FIG. 2 is a flowchart of a warehousing management method according to Embodiment 2 of the present disclosure. Based on Embodiment 1, in this embodiment, the warehousing management system keeps a data record of the current task as a historical data record of a subsequent task, and an operation parameter of the task is determined in the subsequent task by learning the historical data record. As shown in FIG. 2, the method includes the following steps:

Step S201: A warehousing management system acquires a historical data record corresponding to a current task according to first task information of the current task before delivering task information.

The first task information of the current task includes information on one or more of the following dimensions: target robot's first information, target box's first information, or target storage location's first information.

The historical data record is a data record related to a historical task and may include related information of a box, a robot, an storage location, and the like in the historical task, an operation parameter delivered by the warehousing management system for reference, an actual operation parameter for performing the historical task, and the like.

Exemplarily, the target robot's first information may include information such as a type, an identifier, and fork information of the robot. The target box's first information may include information such as a type, a size, a volume, and a weight of the box, and whether the box is deformed. The target storage location's first information may include information such as a location of the target storage location.

In this embodiment, before delivering task information to the robot, the warehousing management system may acquire a historical data record related to the current task according to the first task information of the current task as the historical data record corresponding to the current task. The current task may be a box taking task or a box placing task.

In an optional implementation, the acquiring a historical data record corresponding to a current task according to first task information of the current task may be implemented in the following manners:

acquiring historical data records of all historical tasks; selecting, according to information on at least one dimension, a historical data record consistent with the information on at least one dimension of information on a target storage location and a target box of the current task, and the target robot performing the current task from the historical data records of all the historical tasks, where operation parameter information in the selected historical data record conforms to a mathematical distribution law, and the operation parameter information includes a second operation parameter and/or a first operation parameter; and using the selected historical data record as the historical data record corresponding to the current task.

The information on the target storage location and the target box of the current task, and the target robot performing the current task includes at least one of the following: location information of the target storage location, a type, a size, a volume, and a weight of the target box, and a type and identification information of the target robot.

The first operation parameter is an operation parameter calculated based on the historical data record. The first operation parameter may be carried in the task information and may be sent to the robot that performs the task, and the robot performs the task according to the first operation parameter. Each historical task has a first operation parameter.

The second operation parameter is an actual operation parameter for performing the task by the robot. Each historical task has a second operation parameter, and a second operation parameter of a current task may also be recorded after the current task is performed.

In addition, the first operation parameter of the current task is determined as a preset parameter value if the historical data record consistent with the information on at least one dimension of the information on the target storage location and the target box of the current task, and the target robot performing the current task fails to be selected, where the operation parameter information in the selected historical data record conforms to the mathematical distribution law.

The preset parameter value may be set and adjusted according to requirements of an actual application scenario. This is not specifically in this embodiment.

Optionally, the preset parameter value may be null, that is, the first operation parameter included in the task information is a null value. The robot performs the current task based on the existing method.

Optionally, the preset parameter value may be a set parameter corresponding to the first task information of the current task. Fixed operation parameters corresponding to different storage locations, different robots, and different boxes may be preset and stored.

For example, the fixed operation parameters may be a height of the target storage location, a parameter of a fork of the target robot, and a size of the target box.

In another optional implementation, after historical data records of all historical tasks are acquired, a historical data record consistent with information on at least one dimension of information on a target storage location and a target box of the current task, and the target robot performing the current task from the historical data records of all the historical tasks according to information on at least one dimension, to serve as the historical data record of the current task.

Exemplarily, a historical data record of a historical task performed by a same robot on a box with a same size in a same storage location is selected from the historical data records of all the historical tasks according to the target storage location, the target robot, and the target box of the current task.

In actual application, if the selected historical data record does not conform to any mathematical distribution law, there may be a relatively large error in the first operation parameter of the current task calculated based on the historical data record. If the selected historical data record conforms to a mathematical distribution law, the first operation parameter of the current task calculated based on the historical data record may be very accurately.

The historical data record corresponding to the current task acquired in this embodiment is historical data to be learned when the first operation parameter of the current task is calculated, and a learning range of the current task is determined.

After acquiring the historical data record corresponding to the current task, when the warehousing management system determines the first operation parameter of the current task according to the historical data record, step S202 is performed if the current task is box taking, and step S203 is performed if the current task is box placing.

Step S202: If the current task is box taking, the warehousing management system may determine, according to a second operation parameter of a first task of placing a target box of the current task into a target storage location and another historical data record, a first operation parameter for taking out the target box from the target storage location.

According to information of the current task, if the current task is box taking, the warehousing management system needs to determine a first operation parameter for taking out the target box from the target storage location.

In actual application, if the current task is box taking, an operation parameter actually used by a previous robot for placing the target box into the target storage location has a great reference value. In this step, a second operation parameter of a first task of placing a target box of the current task into a target storage location is selected from the historical data record, and a first operation parameter for taking out the target box from the target storage location is determined based on the second operation parameter of the first task of placing the target box of the current task into the target storage location and another historical data record.

In this step, the determining a first operation parameter of the current task according to the historical data record may specifically be implemented in the following manners:

acquiring operation parameter information in the historical data record, where the operation parameter information includes a second operation parameter and/or a first operation parameter; and calculating the first operation parameter of the current task according to the operation parameter information.

Exemplarily, the second operation parameter is an actual operation parameter used when the robot performs a task. When a first operation parameter of the current task is determined according to the historical data record, the first operation parameter of the current task may be calculated by referring to an actual operation parameter in the historical data record.

Exemplarily, the first operation parameter is an operation parameter calculated based on the historical data record, and is consistent with the actual operation parameter or very close to the actual operation parameter. When a first operation parameter of the current task is determined according to the historical data record, the first operation parameter of the current task may be calculated by referring to a first operation parameter in the historical data record.

Exemplarily, when a first operation parameter of the current task is determined according to the historical data record, the first operation parameter of the current task may be calculated by referring to both the first operation parameter and a second operation parameter in the historical data record.

Further, after to-be-learned operation parameter information is determined, the calculating the first operation parameter of the current task according to the operation parameter information may be implemented in any one of the following manners:

In an optional implementation, the calculating the first operation parameter of the current task according to the operation parameter information may be implemented in the following manners:

determining weight information corresponding to the operation parameter information;
calculating a weighted mean of the operation parameter information according to the weight information; and using the weighted mean as the first operation parameter of the current task.

In an implementation, the first operation parameter of the current task is determined by calculating a weighted mean of the operation parameter information.

Optionally, the weight information corresponding to the operation parameter information may be determined according to execution time points of the operation parameter information. The weight information corresponding to the operation parameter information monotonically increases in chronological order of the execution time points.

Further, if the current task is box taking, when the first operation parameter of the current task is calculated according to the operation parameter information, reference may be mainly made to a second operation parameter of a first task of placing the target box of the current task into the target storage location by a previous robot, that is, an actual operation parameter used when the previous robot places the target box into the target storage location.

Optionally, when the weight information corresponding to the operation parameter information is determined, a weight set for the second operation parameter of the first task of placing the target box of the current task into the target storage location may be a maximum value of weights of all operation parameter information.

In another optional implementation, the calculating the first operation parameter of the current task according to the operation parameter information may be implemented in the following manners:

> determining operation parameter information with a highest frequency of occurrence in the operation parameter information; and using the operation parameter information with the highest frequency of occurrence as the first operation parameter of the current task.

In an implementation, the operation parameter information with a highest frequency of occurrence is used as the first operation parameter of the current task by calculating a mode.

In another optional implementation, the calculating the first operation parameter of the current task according to the operation parameter information may be implemented in the following manners:

> determining a mean and a standard deviation of the operation parameter information through a maximum likelihood estimation method if it is determined that the operation parameter information obeys normal distribution; and using the mean as the first operation parameter of the current task if the standard deviation is less than a standard deviation threshold.

If the standard deviation is less than the standard deviation threshold, it indicates that normal distribution is stable. The mean is used as the first operation parameter of the current task, and there is no error in the first operation parameter or the error is relatively small.

If the standard deviation is greater than or equal to the standard threshold, it indicates that the normal distribution is not stable. The mean is not used as the first operation parameter of the current task, to avoid a relatively large error in the determined first operation parameter.

The standard deviation threshold may be set and adjusted according to an actual application scenario. This is not specifically limited herein.

Step S203: If the current task is box placing, the warehousing management system determines, according to the historical data record, a first operation parameter for placing a target box of the current task into a target storage location.

According to information of the current task, if the current task is box taking, the warehousing management system needs to determine the operation parameter for placing the target box into the target storage location.

In this step, the calculating the first operation parameter of the current task according to the operation parameter information may be implemented in any manner provided in step S202. Details are not described herein again.

Step S204: The warehousing management system delivers the task information including the first operation parameter to a target robot performing the current task.

After determining the first operation parameter of the current task, the warehousing management system carries the first operation parameter of the current task in the task information for sending to the target robot, so that the target robot performs the current task according to the first operation parameter.

Step S205: The target robot receives the task information delivered by the warehousing management system, where the task information includes the first operation parameter.

After receiving the task information delivered by the warehousing management system, the target robot may extract the first operation parameter from the task information.

Step S206: The target robot performs the current task according to the first operation parameter.

In a possible application scenario, if the historical task has a small quantity of historical data records, the historical data record in the historical task may not be related to the current task, the first operation parameter of the current task cannot be accurately calculated based on the historical data record, and the first operation parameter may be null.

The current task is performed based on the existing method if the first operation parameter is null.

Optionally, if the first operation parameter is null, the robot may perform the current task according to a set parameter. The set parameter is an operation parameter associated with information on three dimensions of the target robot, the target box, and the target storage location of the current task. If the information on three dimensions of the storage location, the robot, and the box is different, associated operation parameters are different and may be preset and stored.

In this embodiment, the target robot performs a corresponding operation according to the first operation parameter, and the current task may be smoothly completed without error calibration or only through simple calibration.

The first operation parameter includes a height and an angle of a fork, and a coordinate position of the robot.

Step S207: The target robot sends a second operation parameter for performing the current task to the warehousing management system.

In this embodiment, the first operation parameter and an actual second operation parameter for performing the current task by the target robot may be the same, or may be different.

After completing the current task, the target robot sends the second operation parameter for performing the current task to the warehousing management system, so that the warehousing management system records an actual operation parameter for performing the task.

Step S208: The warehousing management system receives the second operation parameter of the current task sent by the target robot.

After receiving the second operation parameter of the current task sent by the target robot, the warehousing management system may record the second operation parameter of the current task for learning in a subsequent task.

Step S209: The warehousing management system keeps a data record of the current task.

The data record includes: a second operation parameter, the first operation parameter, and information on one or more of the following dimensions of the current task: target robot's second information, target box's second information, or target storage location's second information.

Exemplarily, the target robot's second information may include information such as a type, an identifier, and fork information of the robot. The target box's second information may include information such as a type, a size, a volume, and a weight of the box, and whether the box is deformed. The target storage location's second information may include information such as a location of the target storage location.

In this embodiment, the warehousing management system may keep a data record of a current task after performing a task each time. The data record of the current task may be used as a historical data record of a subsequent task, to provide reference data for calculating an operation parameter in the subsequent task.

A data record of each task may include a calculated first operation parameter, a second operation parameter actually used when the task is successfully performed, and information related to a target robot, a target box, and a target storage location of the task.

When the data record of the current task is kept, a dimension of to-be-recorded data may be set and adjusted according to an actual application situation of an intelligent warehousing system.

For data on a dimension of the robot, if operation parameters of different robots for a same box in a same storage location do not converge, it indicates that the operation parameters for the different robots are not stable enough. In view of this, for different robots, it is necessary to separately record an operation parameter of each robot. Otherwise, if the operation parameters of the different robots for the same box in the same storage location converge, only an operation parameter for operating the box in the storage location by the robot needs to be recorded, and there is no need to differ the robots and record information of the robots.

In an optional implementation, the keeping a data record of the current task includes recording the target robot's second information if second operation parameters of different robots for a same box in a same storage location do not converge according to historical task data in a period of time.

That second operation parameters of different robots for a same box in a same storage location do not converge means that for the same box in the same storage location, there is a relatively large difference between second operation parameters of different robots.

Whether the second operation parameters of different robots for the same box in the same storage location converge may be determined by using any method in the related art for determining whether a group of data converges. Details are not described herein again.

In addition, an actual intelligent warehousing system may include robots of a plurality of different types (for example, a warehousing handling robot, a material box robot, and the like). It is necessary to consider whether second operation parameters of robots of different types for the same box in the same storage location converge, and second operation parameters of different robots of a same type for the same box in the same storage location converge.

Optionally, the keeping a data record of the current task including recording a type of the target robot if second operation parameters of robots of different types for the same box in the same storage location do not converge according to the historical task data in the period of time.

Optionally, the keeping a data record of the current task including recording a type and identification information of the target robot if second operation parameters of different robots of a same type for the same box in the same storage location do not converge according to the historical task data in the period of time.

For example, differences between operation data of different robots may be recorded, and relationships between each robot and a box of a same type and an storage location of a same type are established. Data records may be shown in Table 1 below. The box of the same type may be a same box or boxes with same information on a dimension of the box, for example, a paper box of a same size, and the like. The storage location of a same type may be a same storage location or storage locations with same information on a dimension of the storage location, for example, an storage location of a same height.

TABLE 1

| Robot | Box | Storage location | First operation parameter | Second operation parameter |
|-------|-----|------------------|---------------------------|----------------------------|
| Robot A | Box a | Storage location X | Operation parameter D | D + delta1 |
| Robot B | Box a | Storage location X | Operation parameter D | D + delta2 |
| Robot A | Box b | Storage location Y | Operation parameter d | d + delta3 |

Based on the records in Table 1, when the robot B operates the box b in the storage location Y, the first operation parameter of the current task may be calculated as (d+delta3*delta2/delta1) by using historical data records in Table 1. Only a simple correspondence is given here for ease of understanding. In this embodiment, the first operation parameter of the current task is calculated according to a large amount of operation parameter information conforming to a mathematical distribution law.

For the information on a dimension of the box, in an actual application scenario, a plurality of boxes of different types may be used in the intelligent warehousing system, for example, a material box, a paper box, and the like. The box of a same type may include different attribute information, for example, the paper box includes attribute information such as a size, a volume, and whether the box is transformed, and the material box includes attribute information such as different weights.

When operation parameters of the robot for operating boxes of different types or boxes of a same type that includes different attribute information (such as boxes with different sizes, volumes, and weights) do not converge to a first expected operation parameter, it indicates that operation parameters for different boxes are not stable enough, and it is necessary to record influence of information of different boxes on an operation performed by the robot for learning.

For example, when taking/placing a box a with a weight of 10 kg by using a fork, a first robot may often deviate to the right by a distance, and fine tuning needs to be performed on an angle of the fork, so that the fork moves to the left by a corresponding distance. When taking/placing a box b with a weight of 5 kg by using the fork, the first robot may often deviate to the left by a distance, and fine tuning needs to be performed on an angle of the fork, so that the fork moves to the right by a corresponding distance. In a case that there is no other attitude information than the weight of the box may affect the angle of the fork, an operation parameter, that is, the angle of the fork follows a specific law, which is an operation parameter that can be learned and recorded. Operation parameters are recorded when the first robot performs a box taking/placing task for a plurality of times. When the first robot needs to take/place a box next time, an angle of the fork in the current task is determined by learning historical operation parameters that are recorded. In a case that the robot does not have a feature element that causes difference deviation of the angle of the fork, other robots may also fine-tune the angle of the fork in such a learning manner when taking/placing the box.

In an optional implementation, the keeping a data record of the current task includes recording target box's second information if second operation parameters of a same robot for operating different boxes do not converge to a first expected operation parameter according to historical task data in a period of time, where the target box's second information includes at least one of the following: a type, a size, a volume, and a weight of a box.

The first expected operation parameter may be set and adjusted according to requirements of an actual application scenario. This is not specifically limited herein.

In addition, whether second operation parameters of a same robot for operating different boxes converge to the first expected operation parameter may be determined by using any method in the related art for determining whether a group of data converges to a specified value. Details are not described again herein.

For data on a dimension of the storage location, when operation parameters of a same robot for taking out/placing a same box in different storage locations do not converge to a second expected operation parameter, it indicates that the operation parameters for different storage locations are not stable enough, and it is necessary to separately record and learn an operation parameter of each storage location.

For example, operation parameters of a same robot for operating a same box in different storage locations are shown in Table 2 below:

TABLE 2

| Storage location | Box | Robot | First operation parameter |
|---|---|---|---|
| First storage location | Box a | Robot A | Operation parameter D1 |
| Second storage location | Box a | Robot A | Operation parameter D2 |
| Third storage location | Box a | Robot A | Operation parameter D1 |
| Fourth storage location | Box a | Robot A | Operation parameter D3 |
| . . . | . . . | . . . | . . . |

As shown in Table 2, operation parameters of the robot A for operating the box a in the first storage location and the third storage location are the same, and operation parameters of the robot A for operating the box a in the second storage location and the fourth storage location are different, and are different from the operation parameters for operating in the first storage location and the third storage location. If there is a little difference between D1, D2, D3 . . . , that is, operation parameters of a same robot for operating a same box in different storage locations are slightly different, it indicates that operation parameters for different storage locations are relatively stable, and information on a dimension of the storage location may not be recorded. If there is a large difference between D1, D2, D3 . . . , that is, the operation parameters of the same robot for operating the same box in different storage locations are greatly different, it indicates that the operation parameters for different storage locations are not stable enough, and information on the dimension of the storage location needs to be recorded.

In an optional implementation, the keeping a data record of the current task includes:

the keeping a data record of the current task including recording the target storage location's second information if second operation parameters of a same robot for operating a same box in different storage locations do not converge to a second expected operation parameter according to historical task data in a period of time.

The second expected operation parameter may be set and adjusted according to requirements of an actual application scenario. This is not specifically limited herein.

In addition, whether operation parameters of a same robot for operating a same box in different storage locations converge to the second expected operation parameter may be determined by using any method in the related art for determining whether a group of data converges to a specified value. Details are not described again herein.

In this embodiment of the present disclosure, a data record of a task is generated by recording a first operation parameter and a second operation parameter of each task, and information on one or more dimensions of the robot, the box, or the storage location, so that basic data for learning is provided for calculating the first operation parameter in a subsequent task. Before a warehousing management system delivers task information each time, a first operation parameter used for completing a current task can be accurately calculated by learning a historical data record in a historical task, and a target robot configured to perform the current task operates according to the first operation parameter. In this way, the current task may be smoothly completed without error calibration or only through simple calibration, so that efficiency of performing a task is improved, thereby greatly improving goods taking/placing efficiency of an intelligent warehousing system.

Embodiment 3

Figure 3:
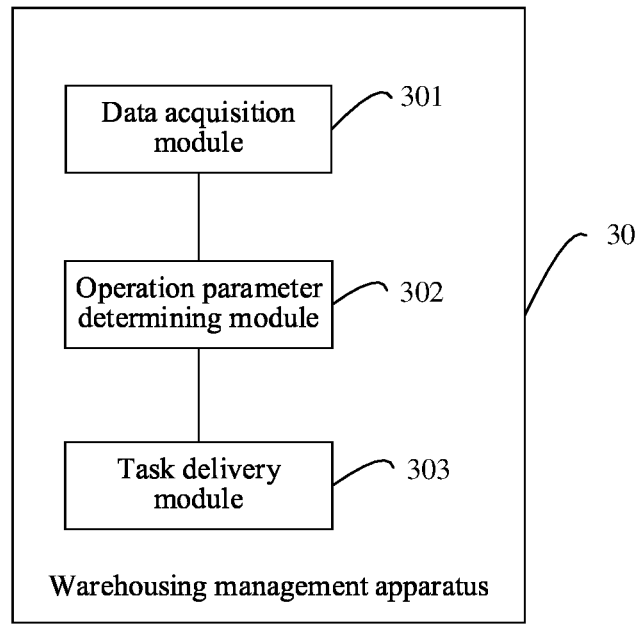
FIG. 3 is a schematic structural diagram of a warehousing management apparatus according to Embodiment 3 of the present disclosure.

FIG. 3 is a schematic structural diagram of a warehousing management apparatus according to Embodiment 3 of the present disclosure. The warehousing management apparatus provided in this embodiment of the present disclosure may perform processing procedures provided in the embodiments of the warehousing management method. As shown in FIG. 3, the warehousing management apparatus 30 includes: a data acquisition module 301, an operation parameter determining module 302, and a task delivery module 303.

Specifically, the data acquisition module 301 is configured to acquire, before task information is delivered, a historical data record corresponding to a current task according to first task information of the current task;

the operation parameter determining module 302 is configured to determine a first operation parameter of the current task according to the historical data record; and the task delivery module 303 is configured to deliver the task information including the first operation parameter to a target robot performing the current task.

The apparatus provided in this embodiment of the present disclosure may be specifically configured to perform the method processes performed by the warehousing management system in the method embodiment provided in Embodiment 1. The specific functions may not be described herein again.

In the embodiments in the present disclosure, before a warehousing management system delivers task information each time, a first operation parameter used for completing a current task can be accurately calculated by learning a historical data record in a historical task, and a target robot configured to perform the current task operates according to the first operation parameter. In this way, the current task may be smoothly completed without error calibration or only through simple calibration, so that efficiency of performing a task is improved, thereby greatly improving goods taking/placing efficiency of an intelligent warehousing system.

Embodiment 4

Figure 4:
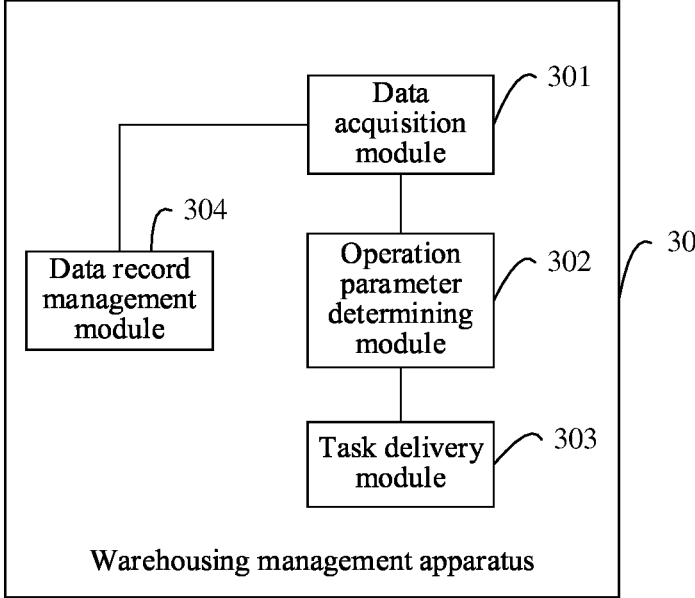
FIG. 4 is a schematic structural diagram of a warehousing management apparatus according to Embodiment 4 of the present disclosure.

FIG. 4 is a schematic structural diagram of a warehousing management apparatus according to Embodiment 4 of the present disclosure. Based on Embodiment 3, in this embodiment, the first task information of the current task includes information on one or more of the following dimensions: target robot's first information, target box's first information, or target storage location's first information.

In an optional implementation, as shown in FIG. 4, the warehousing management apparatus 30 further includes a data record management module 304. The data record management module 304 is configured to:

keep a data record of the current task after the task information including the first operation parameter is delivered to the target robot performing the current task, where the data record includes: a second operation parameter, the first operation parameter, and information on one or more of the following dimensions of the current task: target robot's second information, target box's second information, or target storage location's second information.

In an optional implementation, the data record management module is further configured to:

receive, before recording the data record of the current task, the second operation parameter of the current task sent by the target robot.

In an optional implementation, the data record management module is further configured to:

the keeping a data record of the current task including recording the target robot's second information if second operation parameters of different robots for a same box in a same storage location do not converge according to historical task data in a period of time.

In an optional implementation, the data record management module is further configured to:

the keeping a data record of the current task including recording a type of the target robot if second operation parameters of robots of different types for the same box in the same storage location do not converge according to the historical task data in the period of time.

In an optional implementation, the data record management module is further configured to:

the keeping a data record of the current task including recording a type and identification information of the target robot if second operation parameters of different robots of a same type for the same box in the same storage location do not converge according to the historical task data in the period of time.

In an optional implementation, the data record management module is further configured to:

the keeping a data record of the current task including recording the target box's second information if second operation parameters of a same robot for operating different boxes do not converge to a first expected operation parameter according to historical task data in a period of time, where the target box's second information includes at least one of the following: a type, a size, a volume, and a weight of a box.

In an optional implementation, the data record management module is further configured to:

the keeping a data record of the current task including recording the target storage location's second information if second operation parameters of a same robot for operating a same box in different storage locations do not converge to a second expected operation parameter according to historical task data in a period of time.

In an optional implementation, the operation parameter determining module is further configured to:

if the current task is box taking, determine, according to a second operation parameter of a first task of placing a target box of the current task into a target storage location and the historical data record, a first operation parameter for taking out the target box from the target storage location.

In an optional implementation, the operation parameter determining module is further configured to:

if the current task is box placing, determine, according to the historical data record, a first operation parameter for placing a target box of the current task into a target storage location.

In an optional implementation, the data acquisition module is further configured to:

acquire historical data records of all historical tasks; select, according to information on at least one dimension, a historical data record consistent with the information on at least one dimension of information on a target storage location and a target box of the current task, and the target robot performing the current task from the historical data records of all the historical tasks, where operation parameter information in the selected historical data record conforms to a mathematical distribution law, and the operation parameter information includes a second operation parameter and/or a first operation parameter; and use the selected historical data record as the historical data record corresponding to the current task.

In an optional implementation, the information on the target storage location and the target box of the current task, and the target robot performing the current task includes at least one of the following:

location information of the target storage location, a type, a size, a volume, and a weight of the target box, and a type and identification information of the target robot.

In an optional implementation, the operation parameter determining module is further configured to:

acquire operation parameter information in the historical data record, where the operation parameter information includes a second operation parameter and/or a first operation parameter; and calculate the first operation parameter of the current task according to the operation parameter information.

In an optional implementation, the operation parameter determining module is further configured to:

determine weight information corresponding to the operation parameter information; calculate a weighted mean of the operation parameter information according to the weight information; and use the weighted mean as the first operation parameter of the current task.

In an optional implementation, the operation parameter determining module is further configured to:

determine the weight information corresponding to the operation parameter information according to execution time points of the operation parameter information, where the weight information corresponding to the operation parameter information monotonically increases in chronological order of the execution time points.

In an optional implementation, the operation parameter determining module is further configured to:

determine operation parameter information with a highest frequency of occurrence in the operation parameter information; and use the operation parameter information with the highest frequency of occurrence as the first operation parameter of the current task.

In an optional implementation, the operation parameter determining module is further configured to:

determine a mean and a standard deviation of the operation parameter information through a maximum likelihood estimation method if it is determined that the operation parameter information obeys normal distribution; and use the mean as the first operation parameter of the current task if the standard deviation is less than a standard deviation threshold.

In an optional implementation, the operation parameter determining module is further configured to:

determine the first operation parameter of the current task as a preset parameter value if the historical data record consistent with the information on at least one dimension of the information on the target storage location and the target box of the current task, and the target robot performing the current task fails to be selected, where the operation parameter information in the selected historical data record conforms to the mathematical distribution law.

In an optional implementation, the preset parameter value is null; or the preset parameter value is a set parameter corresponding to the first task information of the current task.

The apparatus provided in this embodiment of the present disclosure may be specifically configured to perform the method processes performed by the warehousing management system in the method embodiment provided in Embodiment 2. The specific functions may not be described herein again.

In this embodiment of the present disclosure, a data record of a task is generated by recording a first operation parameter and a second operation parameter of each task, and information on one or more dimensions of the robot, the box, or the storage location, so that basic data for learning is provided for calculating the first operation parameter in a subsequent task. Before a warehousing management system delivers task information each time, a first operation parameter used for completing a current task can be accurately calculated by learning a historical data record in a historical task, and a target robot configured to perform the current task operates according to the first operation parameter. In this way, the current task may be smoothly completed without error calibration or only through simple calibration, so that efficiency of performing a task is improved, thereby greatly improving goods taking/placing efficiency of an intelligent warehousing system.

Embodiment 5

Figures 5, 6:
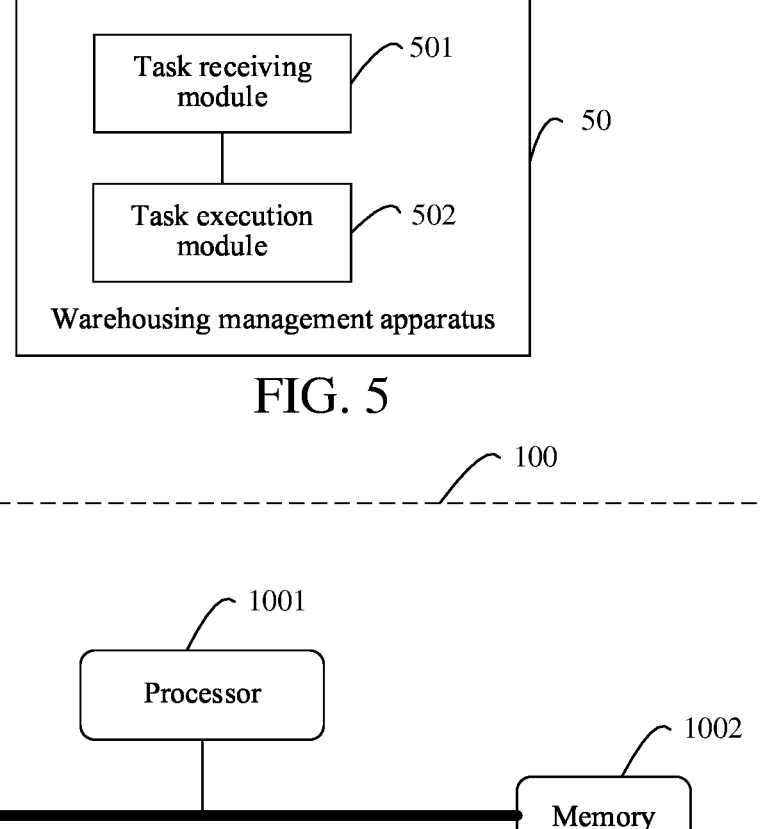
FIG. 5 is a schematic structural diagram of a warehousing management apparatus according to Embodiment 5 of the present disclosure.
FIG. 6 is a schematic structural diagram of a warehousing management system according to Embodiment 6 of the present disclosure.

FIG. 5 is a schematic structural diagram of a warehousing management apparatus according to Embodiment 5 of the present disclosure. The warehousing management apparatus provided in this embodiment of the present disclosure may perform processing procedures provided in the embodiments of the warehousing management method. As shown in FIG. 5, the warehousing management apparatus 50 includes a task receiving module 501 and a task execution module 502.

Specifically, the task receiving module 501 configured to receive task information delivered by a warehousing management system, where the task information includes a first operation parameter; and the task execution module 502 is configured to perform a current task according to the first operation parameter.

In an optional implementation, the task execution module 502 is further configured to:

perform the current task according to a set parameter if the first operation parameter is null.

In an optional implementation, the task execution module 502 is further configured to:

send a second operation parameter for performing the current task to the warehousing management system.

The apparatus provided in this embodiment of the present disclosure may be specifically configured to perform the method processes performed by the robot in the method embodiment provided in Embodiment 1 or Embodiment 2. The specific functions may not be described herein again.

In the embodiments in the present disclosure, before a warehousing management system delivers task information each time, a first operation parameter used for completing a current task can be accurately calculated by learning a historical data record in a historical task, and a target robot configured to perform the current task operates according to the first operation parameter. In this way, the current task may be smoothly completed without error calibration or only through simple calibration, so that efficiency of performing a task is improved, thereby greatly improving goods taking/placing efficiency of an intelligent warehousing system.

Embodiment 6

FIG. 6 is a schematic structural diagram of a warehousing management system according to Embodiment 6 of the present disclosure. As shown in FIG. 6, the warehousing management system 100 includes: a processor 1001, a memory 1002, and a computer program stored in the memory 1002 and runnable on the processor 1001. The processor 1001, when running the computer program, implements method processes performed by the warehousing management system in any method embodiments described above.

In the embodiments in the present disclosure, before a warehousing management system delivers task information each time, a first operation parameter used for completing a current task can be accurately calculated by learning a historical data record in a historical task, and a target robot configured to perform the current task operates according to the first operation parameter. In this way, the current task may be smoothly completed without error calibration or only through simple calibration, so that efficiency of performing a task is improved, thereby greatly improving goods taking/placing efficiency of an intelligent warehousing system.

Embodiment 7

Figure 7:
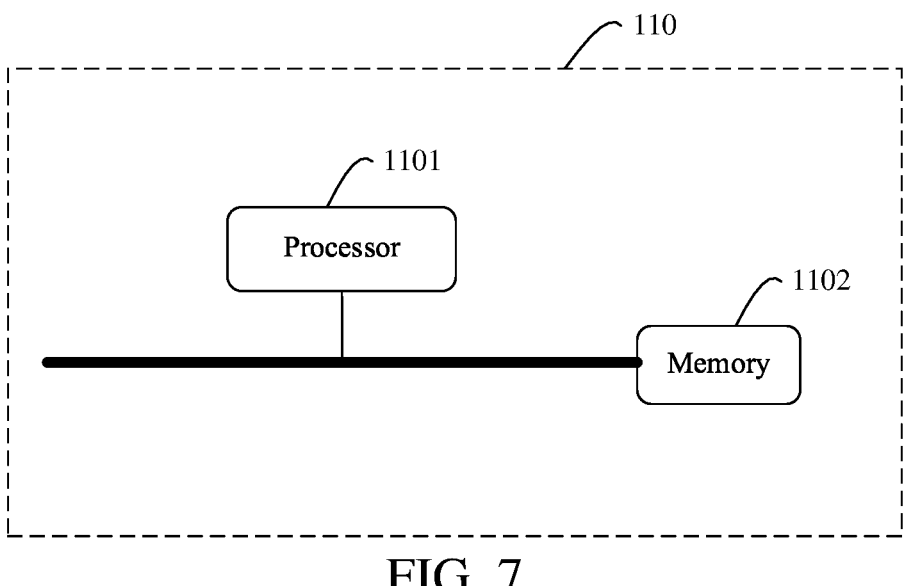
FIG. 7 is a schematic structural diagram of a robot according to Embodiment 7 of the present disclosure.

FIG. 7 is a schematic structural diagram of a robot according to Embodiment 7 of the present disclosure. As shown in FIG. 7, the robot 110 includes: a processor 1101, a memory 1102, and a computer program stored in the memory 1102 and runnable on the processor 1101. The processor 1101, when running the computer program, implements processing procedures performed by the robot in any method embodiments described above.

In the embodiments in the present disclosure, before a warehousing management system delivers task information each time, a first operation parameter used for completing a current task can be accurately calculated by learning a historical data record in a historical task, and a target robot configured to perform the current task operates according to the first operation parameter. In this way, the current task may be smoothly completed without error calibration or only through simple calibration, so that efficiency of performing a task is improved, thereby greatly improving goods taking/placing efficiency of an intelligent warehousing system.

An embodiment of the present disclosure further provides an intelligent warehousing system, including the warehousing management system provided in Embodiment 6 and the robot provided in Embodiment 7

An embodiment of the present disclosure further provides a computer-readable storage medium, storing a computer program, the computer program being executed by a processor to perform the method according to any one of the foregoing method embodiments.

An embodiment of the present disclosure further provides a computer program product, including a computer program, where the computer program is stored in a readable storage medium, at least one processor of an electronic device may read the computer program from the readable storage medium, and the at least one processor executes the computer program to cause the electronic device to perform the method according to any one of the foregoing method embodiments.

In the several embodiments provided in the present disclosure, it should be understood that, the disclosed apparatus and method may be implemented in another manner. For example, the described apparatus embodiments above are merely exemplary. For example, the unit division is merely logical function division and there may be other division manners during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units can or cannot be physical units, and can be located in one location, or can be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of hardware in addition to a software functional unit.

The foregoing integrated unit implemented in a form of a software functional unit may be stored in a computer-readable storage medium. The software functional unit is stored in a storage medium and includes several instructions for instructing a computer device (which may be a personal computer, a server, a network device, or the like) or a processor to perform some of the steps of the methods described in the embodiments of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, a compact disc, or the like.

A person skilled in the art may clearly understand that, for the purpose of convenient and brief description, division of the foregoing function modules is taken as an example for illustration. In actual application, the foregoing functions can be allocated to different function modules and implemented based on a requirement, that is, an inner structure of an apparatus is divided into different function modules to implement all or part of the functions described above. For a detailed working process of the foregoing apparatus, reference may be made to a corresponding process in the foregoing method embodiments, and details are not further described herein.

After considering the specification and practicing the present disclosure, a person skilled in the art can easily conceive of other implementations of the present disclosure. The present disclosure is intended to cover any variation, use, or adaptive change of the present disclosure. These variations, uses, or adaptive changes follow the general principles of the present disclosure and include common general knowledge or common technical means, which are not disclosed in the present disclosure, in the related art. The specification and the embodiments are considered as exemplary only, and a true scope and spirit of the present disclosure are indicated by the following claims.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A warehousing management method, applied to a warehousing management system, the method comprising:

acquiring, before delivering task information, a historical data record corresponding to a current task according to first task information of the current task;

determining a first operation parameter of the current task according to the historical data record; and delivering the task information comprising the first operation parameter of the current task to a target robot performing the current task, to cause the target robot to perform the current task according to the first operation parameter of the current task;

wherein the first task information of the current task comprises information on one or more of the following dimensions: first information of the target robot, first information of a target box, and first information of a target storage location;

wherein the determining the first operation parameter of the current task according to the historical data record comprises:

acquiring operation parameter information in the historical data record, wherein the operation parameter information includes a first operation parameter and a second operation parameter, the first operation parameter is an operation parameter calculated based on the historical data record, each historical task has the first operation parameter, the second operation parameter is an actual operation parameter for performing the task, each historical task has the second operation parameter; and calculating the first operation parameter of the current task according to the operation parameter information;

wherein the calculating the first operation parameter of the current task according to the operation parameter information comprises: determining weight information corresponding to the operation parameter information; calculating a weighted mean of the operation parameter information according to the weight information; and using the weighted mean as the first operation parameter of the current task, wherein the determining weight information corresponding to the operation parameter information comprises: determining the weight information corresponding to the operation parameter information according to execution time points of the operation parameter information, wherein the weight information corresponding to the operation parameter information monotonically increases in chronological order of the execution time points; or wherein the calculating the first operation parameter of the current task according to the operation parameter information comprises: determining operation parameter information with a highest frequency of occurrence in the operation parameter information; and using the operation parameter information with the highest frequency of occurrence as the first operation parameter of the current task; or wherein the calculating the first operation parameter of the current task according to the operation parameter information comprises: determining a mean and a standard deviation of the operation parameter information through a maximum likelihood estimation method if it is determined that the operation parameter information obeys normal distribution; and using the mean as the first operation parameter of the current task if the standard deviation is less than a standard deviation threshold;

wherein after the delivering the task information comprising the first operation parameter of the current task to a target robot performing the current task, the method further comprises:

keeping a data record of the current task, wherein the data record comprises: a second operation parameter of the current task, the first operation parameter of the current task, and information on one or more of the following dimensions of the current task: second information of the target robot, second information of the target box, or second information of the target storage location.

2. The method according to claim 1, wherein before the keeping a data record of the current task, the method further comprises:

receiving the second operation parameter of the current task sent by the target robot.

3. The method according to claim 1, further comprising:

determining the first operation parameter of the current task as a preset parameter value if the historical data record consistent with the information on at least one dimension of the information on the target storage location and the target box of the current task, and the target robot performing the current task fails to be selected.

4. The method according to claim 3, wherein the preset parameter value is null; or the preset parameter value is a set parameter corresponding to the first task information of the current task.

5. The warehousing management method according to claim 1, wherein the keeping the data record of the current task comprises one of:

recording a type of the target robot if second operation parameters of robots of different types for a same box in a same storage location do not converge according to historical task data in a period of time;

recording a type and identification information of the target robot if second operation parameters of different robots of a same type for a same box in a same storage location do not converge according to historical task data in a period of time;

recording the second information of the target robot if second operation parameters of a same robot for operating different boxes do not converge to a first expected operation parameter according to historical task data in a period of time, wherein the second information of the target box comprises at least one of the following: a type, a size, a volume, and a weight of a box; and recording the second information of the target storage location if second operation parameters of a same robot for operating a same box in different storage locations do not converge to a second expected operation parameter according to historical task data in a period of time.

6. A warehousing management method, applied to a robot, the method comprising:

receiving task information delivered by a warehousing management system, wherein the task information comprises a first operation parameter of the current task; wherein the first operation parameter of the current task is determined by the warehousing management system according to a historical data record corresponding to a current task, and the historical data record is acquired according to first task information of the current task, and performing the current task according to the first operation parameter of the current task;

wherein the first task information of the current task comprises information on one or more of the following dimensions: first information of the target robot, first information of a target box, and first information of a target storage location;

wherein the first operation parameter of the current task is determined by: acquiring operation parameter information in the historical data record, wherein the operation parameter information includes a first operation parameter and a second operation parameter, the first operation parameter is an operation parameter calculated based on the historical data record, each historical task has the first operation parameter, the second operation parameter is an actual operation parameter for performing the task, each historical task has the second operation parameter; and calculating the first operation parameter of the current task according to the operation parameter information;

wherein the calculating the first operation parameter of the current task according to the operation parameter information comprises: determining weight information corresponding to the operation parameter information; calculating a weighted mean of the operation parameter information according to the weight information; and using the weighted mean as the first operation parameter of the current task, wherein the determining weight information corresponding to the operation parameter information comprises: determining the weight information corresponding to the operation parameter information according to execution time points of the operation parameter information, where the weight information corresponding to the operation parameter information monotonically increases in chronological order of the execution time points; or wherein the calculating the first operation parameter of the current task according to the operation parameter information comprises: determining operation parameter information with a highest frequency of occurrence in the operation parameter information; and using the operation parameter information with the highest frequency of occurrence as the first operation parameter of the current task; or wherein the calculating the first operation parameter of the current task according to the operation parameter information comprises: determining a mean and a standard deviation of the operation parameter information through a maximum likelihood estimation method if it is determined that the operation parameter information obeys normal distribution; and using the mean as the first operation parameter of the current task if the standard deviation is less than a standard deviation threshold;

wherein after the performing a current task according to the first operation parameter, the method further comprises: sending a second operation parameter for performing the current task to the warehousing management system, such that the warehousing management system keeps a data record of the current task, wherein the data record comprises: the second operation parameter of the current task, the first operation parameter of the current task, and information on one or more of the following dimensions of the current task: target robot's second information, second information of the target box, or second information of the target storage location.

7. The method according to claim 6, wherein the performing a current task according to the first operation parameter comprises:

performing the current task according to a set parameter if the first operation parameter is null.

8. The warehousing management method according to claim 6, wherein the warehousing management system keeps a data record of the current task by one of:

recording a type of the target robot if second operation parameters of robots of different types for a same box in a same storage location do not converge according to historical task data in a period of time;

recording a type and identification information of the target robot if second operation parameters of different robots of a same type for a same box in a same storage location do not converge according to historical task data in a period of time;

recording the second information of the target robot if second operation parameters of a same robot for operating different boxes do not converge to a first expected operation parameter according to historical task data in a period of time, wherein the second information of the target box comprises at least one of the following: a type, a size, a volume, and a weight of a box; and recording the second information of the target storage location if second operation parameters of a same robot for operating a same box in different storage locations do not converge to a second expected operation parameter according to historical task data in a period of time.

9. A warehousing management system, comprising:

a memory, configured to store a computer program, and a processor, configured to run the computer program stored on the memory, wherein the computer program comprises following computer instructions:

acquiring, before delivering task information, a historical data record corresponding to a current task according to first task information of the current task;

determining a first operation parameter of the current task according to the historical data record; and delivering the task information comprising the first operation parameter of the current task to a target robot performing the current task, to cause the target robot to perform the current task according to the first operation parameter of the current task;

wherein the first task information of the current task comprises information on one or more of the following dimensions: first information of the target robot, first information of a target box, and first information of a target storage location;

wherein the determining the first operation parameter of the current task according to the historical data record comprises:

acquiring operation parameter information in the historical data record, wherein the operation parameter information includes a first operation parameter and a second operation parameter, the first operation parameter is an operation parameter calculated based on the historical data record, each historical task has the first operation parameter, the second operation parameter is an actual operation parameter for performing the task, each historical task has the second operation parameter; and calculating the first operation parameter of the current task according to the operation parameter information;

wherein the calculating the first operation parameter of the current task according to the operation parameter information comprises: determining weight information corresponding to the operation parameter information; calculating a weighted mean of the operation parameter information according to the weight information; and using the weighted mean as the first operation parameter of the current task, wherein the determining weight information corresponding to the operation parameter information comprises: determining the weight information corresponding to the operation parameter information according to execution time points of the operation parameter information, where the weight information corresponding to the operation parameter information monotonically increases in chronological order of the execution time points; or wherein the calculating the first operation parameter of the current task according to the operation parameter information comprises: determining operation parameter information with a highest frequency of occurrence in the operation parameter information; and using the operation parameter information with the highest frequency of occurrence as the first operation parameter of the current task; or wherein the calculating the first operation parameter of the current task according to the operation parameter information comprises: determining a mean and a standard deviation of the operation parameter information through a maximum likelihood estimation method if it is determined that the operation parameter information obeys normal distribution; and using the mean as the first operation parameter of the current task if the standard deviation is less than a standard deviation threshold;

wherein after the delivering the task information comprising the first operation parameter of the current task to a target robot performing the current task, the method further comprises:

keeping a data record of the current task, wherein the data record comprises: a second operation parameter of the current task, the first operation parameter of the current task, and information on one or more of the following dimensions of the current task: target robot's second information, second information of the target box, or second information of the target storage location.

10. The system according to claim 9, wherein the computer program comprises following computer instructions: determining the first operation parameter of the current task as a preset parameter value if the historical data record consistent with the information on at least one dimension of the information on the target storage location and the target box of the current task, and the target robot performing the current task fails to be selected.

11. The system according to claim 10, wherein
the preset parameter value is null; or
the preset parameter value is a set parameter corresponding to the first task information of the current task.

12. The warehousing management system according to claim 9, wherein the keeping the data record of the current task comprises one of:

recording a type of the target robot if second operation parameters of robots of different types for a same box in a same storage location do not converge according to historical task data in a period of time;

recording a type and identification information of the target robot if second operation parameters of different robots of a same type for a same box in a same storage location do not converge according to historical task data in a period of time;

recording the second information of the target robot if second operation parameters of a same robot for operating different boxes do not converge to a first expected operation parameter according to historical task data in a period of time, wherein the second information of the target box comprises at least one of the following: a type, a size, a volume, and a weight of a box; and recording the second information of the target storage location if second operation parameters of a same robot for operating a same box in different storage locations do not converge to a second expected operation parameter according to historical task data in a period of time.

13. A robot, comprising:
a memory, configured to store a computer program, and
a processor, configured to run the computer program stored on the memory, wherein
the computer program comprises following computer instructions:
receiving task information delivered by a warehousing management system, wherein the task information comprises a first operation parameter of the current task; wherein the first operation parameter of the current task is determined by the warehousing management system according to a historical data record corresponding to a current task, and the historical data record is acquired according to first task information of the current task, and
performing the current task according to the first operation parameter of the current task;
wherein the first task information of the current task comprises information on one or more of the following dimensions: first information of the target robot, first information of a target box, and first information of a target storage location;
wherein the first operation parameter of the current task is determined by: acquiring operation parameter information in the historical data record, wherein the operation parameter information includes a first operation parameter and a second operation parameter, the first operation parameter is an operation parameter calculated based on the historical data record, each historical task has the first operation parameter, the second operation parameter is an actual operation parameter for performing the task, each historical task has the second operation parameter; and calculating the first operation parameter of the current task according to the operation parameter information;

wherein the calculating the first operation parameter of the current task according to the operation parameter information comprises: determining weight information corresponding to the operation parameter information; calculating a weighted mean of the operation parameter information according to the weight information; and using the weighted mean as the first operation parameter of the current task, wherein the determining weight information corresponding to the operation parameter information comprises: determining the weight information corresponding to the operation parameter information according to execution time points of the operation parameter information, where the weight information corresponding to the operation parameter information monotonically increases in chronological order of the execution time points; or wherein the calculating the first operation parameter of the current task according to the operation parameter information comprises: determining operation parameter information with a highest frequency of occurrence in the operation parameter information; and using the operation parameter information with the highest frequency of occurrence as the first operation parameter of the current task; or wherein the calculating the first operation parameter of the current task according to the operation parameter information comprises: determining a mean and a standard deviation of the operation parameter information through a maximum likelihood estimation method if it is determined that the operation parameter information obeys normal distribution; and using the mean as the first operation parameter of the current task if the standard deviation is less than a standard deviation threshold;

wherein after the performing a current task according to the first operation parameter, the method further comprises: sending a second operation parameter for performing the current task to the warehousing management system, such that the warehousing management system keeps a data record of the current task, wherein the data record comprises: the second operation parameter of the current task, the first operation parameter of the current task, and information on one or more of the following dimensions of the current task: target robot's second information, second information of the target box, or second information of the target storage location.

14. The robot according to claim 13, wherein the computer program comprises following computer instructions:
performing the current task according to a set parameter if the first operation parameter is null.

15. The robot according to claim 13, wherein the warehousing management system keeps a data record of the current task by one of:
recording a type of the target robot if second operation parameters of robots of different types for a same box in a same storage location do not converge according to historical task data in a period of time;
recording a type and identification information of the target robot if second operation parameters of different robots of a same type for a same box in a same storage location do not converge according to historical task data in a period of time;

recording the second information of the target robot if second operation parameters of a same robot for operating different boxes do not converge to a first expected operation parameter according to historical task data in a period of time, wherein the second information of the target box comprises at least one of the following: a type, a size, a volume, and a weight of a box; and recording the second information of the target storage location if second operation parameters of a same robot for operating a same box in different storage locations do not converge to a second expected operation parameter according to historical task data in a period of time.

16. A non-transitory computer-readable storage medium, comprising a computer program executed by a processor, wherein the computer program comprises following computer instructions:

acquiring, before delivering task information, a historical data record corresponding to a current task according to first task information of the current task;

determining a first operation parameter of the current task according to the historical data record; and delivering the task information comprising the first operation parameter of the current task to a target robot performing the current task, to cause the target robot to perform the current task according to the first operation parameter of the current task;

wherein the first task information of the current task comprises information on one or more of the following dimensions: first information of the target robot, first information of a target box, and first information of a target storage location;

wherein the determining the first operation parameter of the current task according to the historical data record comprises:

acquiring operation parameter information in the historical data record, wherein the operation parameter information includes a first operation parameter and a second operation parameter, the first operation parameter is an operation parameter calculated based on the historical data record, each historical task has the first operation parameter, the second operation parameter is an actual operation parameter for performing the task, each historical task has the second operation parameter; and calculating the first operation parameter of the current task according to the operation parameter information;

wherein the calculating the first operation parameter of the current task according to the operation parameter information comprises: determining weight information corresponding to the operation parameter information; calculating a weighted mean of the operation parameter information according to the weight information; and using the weighted mean as the first operation parameter of the current task, wherein the determining weight information corresponding to the operation parameter information comprises: determining the weight information corresponding to the operation parameter information according to execution time points of the operation parameter information, where the weight information corresponding to the operation parameter information monotonically increases in chronological order of the execution time points; or wherein the calculating the first operation parameter of the current task according to the operation parameter information comprises: determining operation parameter information with a highest frequency of occurrence in the operation parameter information; and using the operation parameter information with the highest frequency of occurrence as the first operation parameter of the current task; or wherein the calculating the first operation parameter of the current task according to the operation parameter information comprises: determining a mean and a standard deviation of the operation parameter information through a maximum likelihood estimation method if it is determined that the operation parameter information obeys normal distribution; and using the mean as the first operation parameter of the current task if the standard deviation is less than a standard deviation threshold;

wherein after the delivering the task information comprising the first operation parameter of the current task to a target robot performing the current task, the method further comprises:

keeping a data record of the current task, wherein the data record comprises: a second operation parameter of the current task, the first operation parameter of the current task, and information on one or more of the following dimensions of the current task: target robot's second information, second information of the target box, or second information of the target storage location.

17. The non-transitory computer-readable storage medium according to claim 16, wherein the keeping the data record of the current task comprises one of:

recording a type of the target robot if second operation parameters of robots of different types for a same box in a same storage location do not converge according to historical task data in a period of time;

recording a type and identification information of the target robot if second operation parameters of different robots of a same type for a same box in a same storage location do not converge according to historical task data in a period of time;

recording the second information of the target robot if second operation parameters of a same robot for operating different boxes do not converge to a first expected operation parameter according to historical task data in a period of time, wherein the second information of the target box comprises at least one of the following: a type, a size, a volume, and a weight of a box; and recording the second information of the target storage location if second operation parameters of a same robot for operating a same box in different storage locations do not converge to a second expected operation parameter according to historical task data in a period of time.

18. A non-transitory computer-readable storage medium, comprising a computer program executed by a processor, wherein when the computer program is executed by the processor, the computer program is used for controlling a robot to perform:

receiving task information delivered by a warehousing management system, wherein the task information comprises a first operation parameter of the current task;

wherein the first operation parameter of the current task is determined by the warehousing management system according to a historical data record corresponding to a current task, and the historical data record is acquired according to first task information of the current task, and performing the current task according to the first operation parameter of the current task;

wherein the first task information of the current task comprises information on one or more of the following dimensions: first information of the target robot, first information of a target box, and first information of a target storage location;

wherein the first operation parameter of the current task is determined by: acquiring operation parameter information in the historical data record, wherein the operation parameter information includes a first operation parameter and a second operation parameter, the first operation parameter is an operation parameter calculated based on the historical data record, each historical task has the first operation parameter, the second operation parameter is an actual operation parameter for performing the task, each historical task has the second operation parameter; and calculating the first operation parameter of the current task according to the operation parameter information;

wherein the calculating the first operation parameter of the current task according to the operation parameter information comprises: determining weight information corresponding to the operation parameter information; calculating a weighted mean of the operation parameter information according to the weight information; and using the weighted mean as the first operation parameter of the current task, wherein the determining weight information corresponding to the operation parameter information comprises: determining the weight information corresponding to the operation parameter information according to execution time points of the operation parameter information, where the weight information corresponding to the operation parameter information monotonically increases in chronological order of the execution time points; or wherein the calculating the first operation parameter of the current task according to the operation parameter information comprises: determining operation parameter information with a highest frequency of occurrence in the operation parameter information; and using the operation parameter information with the highest frequency of occurrence as the first operation parameter of the current task; or wherein the calculating the first operation parameter of the current task according to the operation parameter information comprises: determining a mean and a standard deviation of the operation parameter information through a maximum likelihood estimation method if it is determined that the operation parameter information obeys normal distribution; and using the mean as the first operation parameter of the current task if the standard deviation is less than a standard deviation threshold;

wherein after the performing a current task according to the first operation parameter, the method further comprises: sending a second operation parameter for performing the current task to the warehousing management system, such that the warehousing management system keeps a data record of the current task, wherein the data record comprises: the second operation parameter of the current task, the first operation parameter of the current task, and information on one or more of the following dimensions of the current task: target robot's second information, second information of the target box, or second information of the target storage location.

19. The non-transitory computer-readable storage medium according to claim 18, wherein the warehousing management system keeps a data record of the current task by one of:

recording a type of the target robot if second operation parameters of robots of different types for a same box in a same storage location do not converge according to historical task data in a period of time;

recording a type and identification information of the target robot if second operation parameters of different robots of a same type for a same box in a same storage location do not converge according to historical task data in a period of time;

recording the second information of the target robot if second operation parameters of a same robot for operating different boxes do not converge to a first expected operation parameter according to historical task data in a period of time, wherein the second information of the target box comprises at least one of the following: a type, a size, a volume, and a weight of a box; and recording the second information of the target storage location if second operation parameters of a same robot for operating a same box in different storage locations do not converge to a second expected operation parameter according to historical task data in a period of time.

\* \* \* \* \*